(12) United States Patent
Hinman et al.

(10) Patent No.: US 9,998,246 B2
(45) Date of Patent: Jun. 12, 2018

(54) SIMULTANEOUS TRANSMISSION ON SHARED CHANNEL

(71) Applicant: Mimosa Networks, Inc., Campbell, CA (US)

(72) Inventors: Brian Hinman, Los Gatos, CA (US); Jaime Fink, San Francisco, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 0 days. days.

(21) Appl. No.: 14/657,942

(22) Filed: Mar. 13, 2015

(65) Prior Publication Data

US 2015/0263816 A1    Sep. 17, 2015

Related U.S. Application Data

(60) Provisional application No. 61/952,597, filed on Mar. 13, 2014.

(51) Int. Cl.
*H04J 3/06* (2006.01)
*H01Q 1/40* (2006.01)
(Continued)

(52) U.S. Cl.
CPC .............. *H04J 3/0676* (2013.01); *H01Q 1/40* (2013.01); *H01Q 17/00* (2013.01); *H01Q 19/19* (2013.01);
(Continued)

(58) Field of Classification Search
CPC ......... H04J 3/0676; H04L 1/00; H04W 52/04; H04W 72/0453; H04W 72/12; H01Q 19/19; H01Q 1/40; H01Q 17/00
See application file for complete search history.

(56) References Cited

U.S. PATENT DOCUMENTS

| 2,735,993 A | 2/1956 | Humphrey |
| 3,182,129 A | 5/1965 | Clark et al. |

(Continued)

FOREIGN PATENT DOCUMENTS

| CN | 104335654 A | 2/2015 |
| CN | 303453662 S | 11/2015 |

(Continued)

OTHER PUBLICATIONS

International Search Report and Written Opinion of the International Search Authority dated Jun. 29, 2015 in Patent Cooperation Treaty Application No. PCT/US2015/012285, filed Jan. 21, 2015.

(Continued)

*Primary Examiner* — Christopher Grey
(74) *Attorney, Agent, or Firm* — Carr & Ferrell LLP

(57) ABSTRACT

Simultaneous transmission on a shared channel by a plurality of collocated radios is provided herein. The two or more radios are collocated with one another and are communicating with two far radios over a pair of long range wireless links. The two or more radios are configured to transmit and receive in synchronization with one another on a same channel. An off-axis response for each of the two or more radios is reduced compared to their on-axis response for improved signal to noise ratio, and the on-axis response the two or more radios are substantially equal to one another.

20 Claims, 7 Drawing Sheets

(51) Int. Cl.
  *H01Q 17/00* (2006.01)
  *H01Q 19/19* (2006.01)
  *H04L 1/00* (2006.01)
  *H04W 52/04* (2009.01)
  *H04W 72/04* (2009.01)
  *H04W 72/12* (2009.01)

(52) U.S. Cl.
  CPC .............. *H04L 1/00* (2013.01); *H04W 52/04* (2013.01); *H04W 72/0453* (2013.01); *H04W 72/12* (2013.01)

(56) References Cited

U.S. PATENT DOCUMENTS

| | | |
|---|---|---|
| D227,476 S | 6/1973 | Kennedy |
| 4,188,633 A | 2/1980 | Frazita |
| 4,402,566 A | 9/1983 | Powell et al. |
| D273,111 S | 3/1984 | Hirata et al. |
| 4,543,579 A | 9/1985 | Teshirogi |
| 4,626,863 A | 12/1986 | Knop et al. |
| 4,835,538 A | 5/1989 | McKenna et al. |
| 4,866,451 A | 9/1989 | Chen |
| 4,893,288 A | 1/1990 | Maier et al. |
| 4,903,033 A | 2/1990 | Tsao et al. |
| 4,986,764 A | 1/1991 | Eaby et al. |
| 5,015,195 A | 5/1991 | Piriz |
| 5,226,837 A | 7/1993 | Cinibulk et al. |
| 5,231,406 A | 7/1993 | Sreenivas |
| D346,598 S | 5/1994 | McCay et al. |
| D355,416 S | 2/1995 | McCay et al. |
| 5,389,941 A | 2/1995 | Yu |
| 5,491,833 A | 2/1996 | Hamabe |
| 5,513,380 A | 4/1996 | Ivanov et al. |
| 5,561,434 A | 10/1996 | Yamazaki |
| D375,501 S | 11/1996 | Lee et al. |
| 5,580,264 A | 12/1996 | Aoyama et al. |
| 5,684,495 A | 11/1997 | Dyott et al. |
| D389,575 S | 1/1998 | Grasfield et al. |
| 5,724,666 A | 3/1998 | Dent |
| 5,742,911 A | 4/1998 | Dumbrill et al. |
| 5,746,611 A | 5/1998 | Brown et al. |
| 6,014,372 A | 1/2000 | Kent et al. |
| 6,067,053 A | 5/2000 | Runyon et al. |
| 6,137,449 A | 10/2000 | Kildal |
| 6,140,962 A | 10/2000 | Groenenboom |
| 6,176,739 B1 | 1/2001 | Denlinger et al. |
| 6,216,266 B1 | 4/2001 | Eastman et al. |
| 6,304,762 B1 | 10/2001 | Myers et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,877,277 B2 | 4/2005 | Kussel et al. |
| 6,962,445 B2 | 11/2005 | Zimmel et al. |
| 7,075,492 B1 * | 7/2006 | Chen .................... H01Q 19/193 343/755 |
| D533,899 S | 12/2006 | Ohashi et al. |
| 7,173,570 B1 | 2/2007 | Wensink et al. |
| 7,193,562 B2 | 3/2007 | Shtrom et al. |
| 7,212,163 B2 | 5/2007 | Huang et al. |
| 7,245,265 B2 | 7/2007 | Kienzle et al. |
| 7,253,783 B2 | 8/2007 | Chiang et al. |
| 7,264,494 B2 | 9/2007 | Kennedy et al. |
| 7,281,856 B2 | 10/2007 | Grzegorzewska et al. |
| 7,292,198 B2 | 11/2007 | Shtrom et al. |
| 7,306,485 B2 | 12/2007 | Masuzaki |
| 7,324,057 B2 | 1/2008 | Argaman et al. |
| D566,698 S | 4/2008 | Choi et al. |
| 7,362,236 B2 | 4/2008 | Hoiness |
| 7,369,095 B2 | 5/2008 | Hirtzlin et al. |
| 7,380,984 B2 | 6/2008 | Wuester |
| 7,431,602 B2 | 10/2008 | Corona |
| 7,498,996 B2 | 3/2009 | Shtrom et al. |
| 7,507,105 B1 | 3/2009 | Peters et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,675,473 B2 | 3/2010 | Kienzle et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,009,646 B2 | 8/2011 | Lastinger et al. |
| 8,069,465 B1 | 11/2011 | Bartholomay et al. |
| 8,111,678 B2 | 2/2012 | Lastinger et al. |
| 8,270,383 B2 | 9/2012 | Lastinger et al. |
| 8,325,695 B2 | 12/2012 | Lastinger et al. |
| D674,787 S | 1/2013 | Tsuda et al. |
| 8,345,651 B2 | 1/2013 | Lastinger et al. |
| 8,482,478 B2 | 7/2013 | Hartenstein |
| 8,515,434 B1 | 8/2013 | Narendran et al. |
| 8,515,495 B2 | 8/2013 | Shang et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,870,069 B2 | 10/2014 | Bellows |
| 8,935,122 B2 | 1/2015 | Stisser |
| 9,001,689 B1 | 4/2015 | Hinman et al. |
| 9,019,874 B2 | 4/2015 | Choudhury et al. |
| 9,077,071 B2 | 7/2015 | Shtrom et al. |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| 9,362,629 B2 | 6/2016 | Hinman et al. |
| 9,391,375 B1 | 7/2016 | Bales et al. |
| 9,407,012 B2 | 8/2016 | Shtrom et al. |
| 9,431,702 B2 | 8/2016 | Hartenstein |
| 9,504,049 B2 | 11/2016 | Hinman et al. |
| 9,531,114 B2 | 12/2016 | Ramos et al. |
| 9,537,204 B2 | 1/2017 | Cheng et al. |
| 9,693,388 B2 | 6/2017 | Fink et al. |
| 9,780,892 B2 | 10/2017 | Hinman et al. |
| 9,843,940 B2 | 12/2017 | Hinman et al. |
| 9,871,302 B2 | 1/2018 | Hinman et al. |
| 9,888,485 B2 | 2/2018 | Hinman et al. |
| 9,930,592 B2 | 3/2018 | Hinman |
| 9,949,147 B2 | 4/2018 | Hinman et al. |
| 2001/0033600 A1 | 10/2001 | Yang et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi et al. |
| 2003/0222831 A1 | 12/2003 | Dunlap |
| 2003/0224741 A1 | 12/2003 | Sugar et al. |
| 2004/0002357 A1* | 1/2004 | Benveniste ........... H04W 72/12 455/550.1 |
| 2004/0029549 A1 | 2/2004 | Fikart |
| 2004/0120277 A1 | 6/2004 | Holur et al. |
| 2004/0196812 A1 | 10/2004 | Barber |
| 2004/0196813 A1 | 10/2004 | Ofek et al. |
| 2004/0240376 A1 | 12/2004 | Wang et al. |
| 2004/0242274 A1 | 12/2004 | Corbett et al. |
| 2005/0032479 A1 | 2/2005 | Miller et al. |
| 2005/0058111 A1 | 3/2005 | Hung et al. |
| 2005/0124294 A1 | 6/2005 | Wentink |
| 2005/0143014 A1* | 6/2005 | Li ....................... H04B 7/0619 455/69 |
| 2005/0195758 A1 | 9/2005 | Chitrapu |
| 2005/0227625 A1 | 10/2005 | Diener |
| 2005/0254442 A1 | 11/2005 | Proctor, Jr. et al. |
| 2005/0271056 A1 | 12/2005 | Kaneko |
| 2006/0072518 A1 | 4/2006 | Pan et al. |
| 2006/0098592 A1 | 5/2006 | Proctor, Jr. et al. |
| 2006/0099940 A1 | 5/2006 | Pfleging et al. |

(56) References Cited

U.S. PATENT DOCUMENTS

| | | |
|---|---|---|
| 2006/0132359 A1 | 6/2006 | Chang et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2006/0211430 A1 | 9/2006 | Persico |
| 2007/0001910 A1 | 1/2007 | Yamanaka et al. |
| 2007/0019664 A1 | 1/2007 | Benveniste |
| 2007/0035463 A1 | 2/2007 | Hirabayashi |
| 2007/0060158 A1 | 3/2007 | Medepalli et al. |
| 2007/0132643 A1 | 6/2007 | Durham et al. |
| 2007/0173199 A1 | 7/2007 | Sinha |
| 2007/0173260 A1 | 7/2007 | Love et al. |
| 2007/0210974 A1 | 9/2007 | Chiang |
| 2007/0223701 A1 | 9/2007 | Emeott et al. |
| 2007/0238482 A1 | 10/2007 | Rayzman et al. |
| 2007/0255797 A1 | 11/2007 | Dunn et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0192707 A1 | 8/2008 | Xhafa et al. |
| 2008/0218418 A1 | 9/2008 | Gillette |
| 2008/0242342 A1 | 10/2008 | Rofougaran |
| 2009/0046673 A1 | 2/2009 | Kaidar |
| 2009/0052362 A1 | 2/2009 | Meier et al. |
| 2009/0075606 A1 | 3/2009 | Shtrom et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0046650 A1 | 2/2010 | Jongren et al. |
| 2010/0067505 A1 | 3/2010 | Fein et al. |
| 2010/0085950 A1 | 4/2010 | Sekiya et al. |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0136978 A1 | 6/2010 | Cho et al. |
| 2010/0151877 A1 | 6/2010 | Lee et al. |
| 2010/0167719 A1 | 7/2010 | Sun |
| 2010/0171665 A1 | 7/2010 | Nogami |
| 2010/0171675 A1 | 7/2010 | Borja et al. |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0238083 A1 | 9/2010 | Malasani |
| 2010/0315307 A1 | 12/2010 | Syed et al. |
| 2010/0322219 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0103309 A1 | 5/2011 | Wang et al. |
| 2011/0111715 A1 | 5/2011 | Buer et al. |
| 2011/0133996 A1 | 6/2011 | Alapuranen |
| 2011/0170424 A1 | 7/2011 | Safavi |
| 2011/0172916 A1 | 7/2011 | Pakzad et al. |
| 2011/0182260 A1* | 7/2011 | Sivakumar ............ H04W 28/06 370/329 |
| 2011/0182277 A1 | 7/2011 | Shapira |
| 2011/0194644 A1 | 8/2011 | Liu et al. |
| 2011/0241969 A1 | 10/2011 | Zhang et al. |
| 2011/0243291 A1 | 10/2011 | McAllister et al. |
| 2011/0256874 A1 | 10/2011 | Hayama et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0238201 A1 | 9/2012 | Du et al. |
| 2012/0263145 A1 | 10/2012 | Marinier et al. |
| 2012/0282868 A1 | 11/2012 | Hahn |
| 2012/0299789 A1 | 11/2012 | Orban et al. |
| 2012/0314634 A1 | 12/2012 | Sekhar |
| 2013/0003645 A1 | 1/2013 | Shapira et al. |
| 2013/0005350 A1 | 1/2013 | Campos et al. |
| 2013/0023216 A1 | 1/2013 | Moscibroda et al. |
| 2013/0064161 A1 | 3/2013 | Hedayat et al. |
| 2013/0082899 A1 | 4/2013 | Gomi |
| 2013/0095747 A1* | 4/2013 | Moshfeghi ............ H04W 88/06 455/7 |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li |
| 2013/0271319 A1 | 10/2013 | Trerise |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0145890 A1 | 5/2014 | Ramberg et al. |
| 2014/0185494 A1* | 7/2014 | Yang ................ H04W 56/0005 370/280 |
| 2014/0191918 A1 | 7/2014 | Cheng et al. |
| 2014/0198867 A1 | 7/2014 | Sturkovich et al. |
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0015435 A1 | 1/2015 | Shen et al. |
| 2015/0215952 A1 | 7/2015 | Hinman et al. |
| 2015/0256275 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0119018 A1 | 4/2016 | Lindgren et al. |
| 2016/0149634 A1 | 5/2016 | Kalkunte et al. |
| 2016/0149635 A1 | 5/2016 | Hinman et al. |
| 2016/0211583 A1 | 7/2016 | Lee et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2018/0034166 A1 | 2/2018 | Hinman |
| 2018/0035317 A1 | 2/2018 | Hinman et al. |
| 2018/0083365 A1 | 3/2018 | Hinman et al. |
| 2018/0084563 A1 | 3/2018 | Hinman et al. |

FOREIGN PATENT DOCUMENTS

| | | |
|---|---|---|
| CN | 105191204 | 12/2015 |
| EP | 1384285 B1 | 6/2007 |
| EP | 002640177 | 2/2015 |
| WO | WO2014137370 | 9/2014 |
| WO | WO2014138292 | 9/2014 |
| WO | WO2014193394 | 12/2014 |
| WO | WO2015112627 | 7/2015 |
| WO | WO2017123558 A1 | 7/2017 |
| WO | WO2018022526 A1 | 2/2018 |

(56) References Cited

FOREIGN PATENT DOCUMENTS

OTHER PUBLICATIONS

Hinman et al., U.S. Appl. No. 61/774,632, filed Mar. 7, 2013.
First Official Notification dated Jun. 15, 2015 in Chinese Design Patent Application 201530058063.8, filed Mar. 11, 2015.
Notice of Allowance dated Sep. 8, 2015 in Chinese Design Patent Application 201530058063.8, filed Mar. 11, 2015.
International Search Report and Written Opinion of the International Search Authority dated Nov. 26, 2013 in Patent Cooperation Treaty Application No. PCT/US2013/047406, filed Jun. 24, 2013.
International Search Report and Written Opinion of the International Search Authority dated Aug. 9, 2013 in Patent Cooperation Treaty Application No. PCT/US2013/043436, filed May 30, 2013.
International Search Report and Written Opinion of the International Search Authority dated Jul. 1, 2014 in Patent Cooperation Treaty Application No. PCT/US2014/020880, filed Mar. 5, 2014.
"Office Action," Chinese Patent Application No. 201580000078.6, dated Nov. 3, 2017, 5 pages [10 pages including translation].
"International Search Report" and "Written Opinion of the International Searching Authority," Patent Cooperation Treaty Application No. PCT/US2017/043560, dated Nov. 16, 2017, 11 pages.
Advisory Action, dated Mar. 2, 2016, U.S. Appl. No. 14/183,375, filed Feb. 18, 2014.
Non-Final Office Action, dated Mar. 16, 2016, U.S. Appl. No. 14/325,307, filed Jul. 7, 2014.
Notice of Allowance, dated Apr. 6, 2016, U.S. Appl. No. 14/198,378, filed Mar. 5, 2014.
Non-Final Office Action, dated Apr. 7, 2016, U.S. Appl. No. 14/639,976, filed Mar. 5, 2015.
Advisory Action, dated Jan. 19, 2017, U.S. Appl. No. 14/639,976, filed Mar. 5, 2015.
Non-Final Office Action, dated Jan. 27, 2017, U.S. Appl. No. 14/198,473, dated Mar. 5, 2014.
Non-Final Office Action, dated Feb. 17, 2017, U.S. Appl. No. 14/833,038, filed Aug. 21, 2015.
Non-Final Office Action, dated Feb. 23, 2017, U.S. Appl. No. 15/246,094, filed Aug. 24, 2016.
Notice of Allowance, dated Mar. 1, 2017, U.S. Appl. No. 14/741,423, filed Jun. 16, 2015.
Non-Final Office Action, dated Sep. 15, 2016, U.S. Appl. No. 14/183,375, filed Feb. 18, 2014.
Final Office Action, dated Oct. 12, 2016, U.S. Appl. No. 14/741,423, filed Jun. 16, 2015.
Final Office Action, dated Oct. 17, 2016, U.S. Appl. No. 14/639,976, filed Mar. 5, 2015.
Non-Final Office Action, dated Oct. 26, 2016, U.S. Appl. No. 15/139,225, filed Apr. 26, 2016.
Non-Final Office Action, dated Mar. 30, 2017, U.S. Appl. No. 15/246,118, filed Aug. 24, 2016.
Non-Final Office Action, dated Mar. 31, 2017, U.S. Appl. No. 14/316,537, filed Jun. 26, 2014.
Notice of Allowance, dated Apr. 10, 2017, U.S. Appl. No. 14/639,976, filed Mar. 5, 2015.
Final Office Action, dated Apr. 13, 2017, U.S. Appl. No. 15/139,225, filed Apr. 26, 2016.
Final Office Action, dated May 11, 2017, U.S. Appl. No. 14/183,375, filed Feb. 18, 2014.
Non-Final Office Action, dated Jun. 7, 2017, U.S. Appl. No. 14/802,816, filed Jul. 17, 2015.
Non-Final Office Action, dated Apr. 26, 2016, U.S. Appl. No. 14/802,829, filed Jul. 17, 2015.
Weisstein, Eric "Electric Polarization", Retrieved from the Internet [retrieved Mar. 23, 2007] available at <http://scienceworld.wolfram.com/physics/ElectricPolarization.html>, 1 page.
Liu, Lingjia et al., "Downlink MIMO in LTE-Advanced: SU-MIMO vs. MU-MIMO," IEEE Communications Magazine, Feb. 2012, pp. 140-147.
International Search Report and "Written Opinion of the International Searching Authority," Patent Cooperation Treaty Application No. PCT/US2017/012884, Apr. 6, 2017, 9 pages.

* cited by examiner

SIMULTANEOUS TRANSMISSION ON SHARED CHANNEL

CROSS REFERENCE TO RELATED APPLICATIONS

This application claims the priority benefit of U.S. Provisional Application Ser. No. 61/952,597, filed on Mar. 13, 2014, which is hereby incorporated by reference herein in its entirety, including all references cited therein.

FIELD OF THE INVENTION

The present technology may be generally described as providing simultaneous transmission of data on a shared channel, such as in the context of a wireless radio communications system.

SUMMARY

According to some embodiments, the present technology is directed to a system, comprising two or more radios collocated with one another, the two or more radios communicating with two far radios over a pair of long range wireless links, the two or more radios being configured to transmit and receive in synchronization with one another on a same channel, wherein an off-axis response for each of the two or more radios is reduced compared to their on-axis response for improved signal to noise ratio, further wherein the on-axis response the two or more radios are substantially equal to one another.

According to some embodiments, the present technology is directed to a method, comprising: (a) transmitting signals on a same channel by two or more collocated radios by: (i) synchronizing transmit and receive time periods of the two or more radios such that the two or more collocated radios transmit at the same time and receive at the same time as one another; (ii) reducing an off-axis response for each of the two or more radios relative to their on-axis response; and (iii) balancing the on-axis response for each of the two or more radios such that they are substantially equivalent to one another.

According to some embodiments, the present technology is directed to a method of communication synchronization between two or more radios, the two or more radios having angular separation or physical characteristics that optimize their on-axis responses, the method comprising: (a) selecting a shared channel for the two or more radios; (b) synchronizing transmit and receive time periods of the two or more radios such that the two or more collocated radios transmit at the same time and receive at the same time as one another on the shared channel; and (c) balancing an on-axis response for each of the two or more radios such that they are substantially equivalent to one another.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
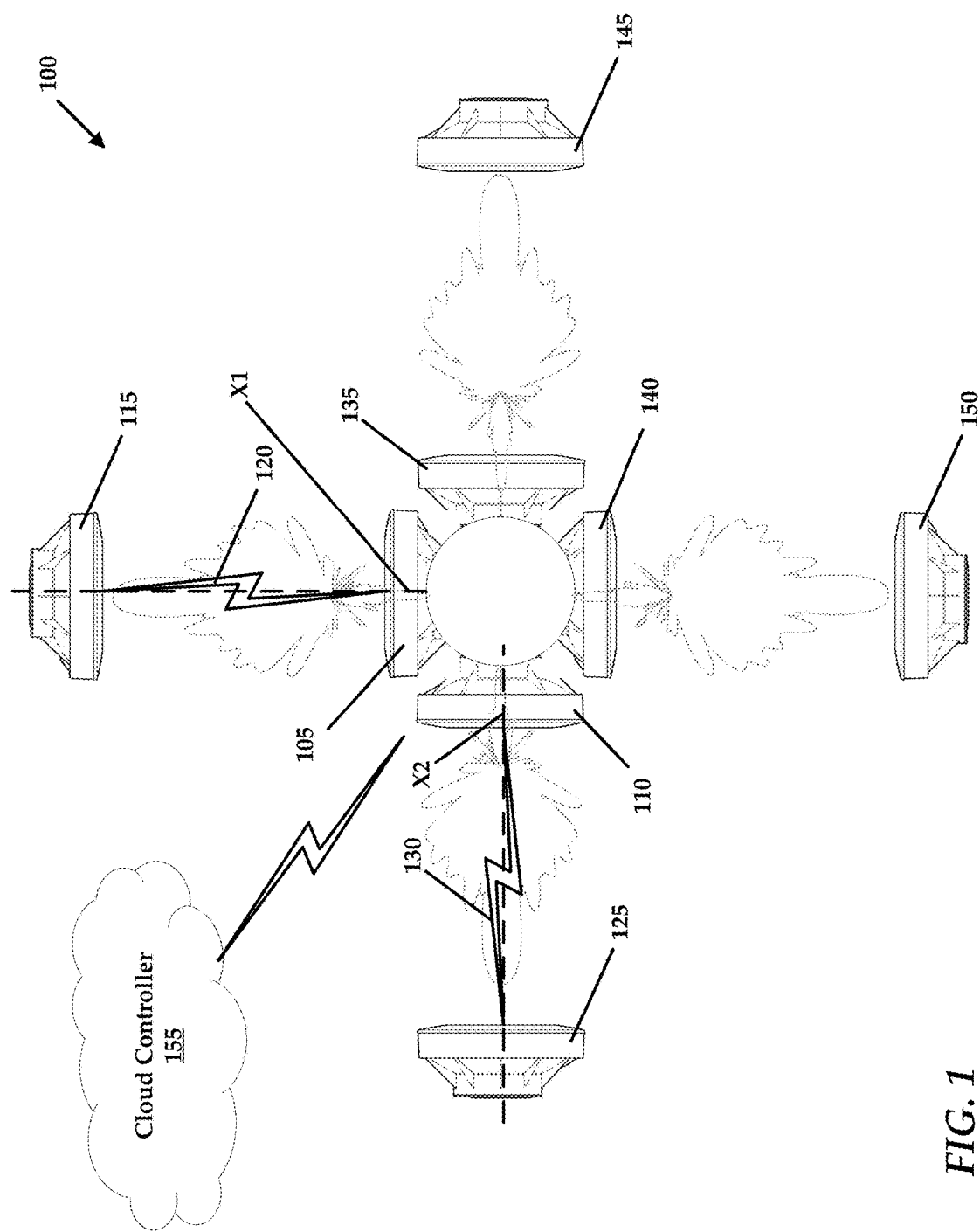
FIG. 1 is a schematic diagram of an example radio system that comprises a plurality of collocated radios that are configured to use a shared channel for communication with a plurality of far radios.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology provides methods for simultaneous transmission of data on a shared channel using a plurality of collocated radios.

Referring now to FIG. 1, an example radio system 100 is illustrated. The radio system 100 comprises two or more collocated radios such as radio 105 and radio 110. These radios are located in proximity to one another such that without the use of the present technology, the radios would interfere with one another when transmitting or receiving.

The radios 105 and 110 are each coupled with far radios over long range wireless links. For example, radio 105 is couplable with a first far radio 115 over a long range wireless link 120 and radio 110 is couplable with a second far radio 125 over a long range wireless link 130. To be sure, additional collocated and far radios can be utilized to practice the present technology, such as radios 135 and 140 and far radios 145 and 150.

The radio system 100 can comprise a cloud controller 155 that is utilized to control various aspects of the radio system 100 such as channel synchronization and antenna gain adjustment, as will be described in greater detail infra.

Each of the radios 105 and 110 will have an on-axis response and an off-axis response when transmitting and receiving signals. The on-axis response for a radio occurs along a main axis of a radio such as axis X1 for radio 105 and axis X2 for radio 110. For example, radio 105 will have an on-axis response to signals from the first far radio 115. An off-axis response is where interference is experienced by a radio due to overlapping signals from other radios. For example, radio 105 may have an off-axis response due to bleed over from radio 110 or over from the second far radio 125. For example, if the second far radio 125 antenna gain is too powerful its radiation pattern can partially envelop the radio 105, interfering with the on-axis signal.

Generally, the present technology utilizes a set of features that allow the radios 105 and 110 to transmit or receive in synchronization with one another. In one embodiment, the radios 105 and 110 utilize the same channel or frequency. Additionally, a signal-to-noise (SNR) ratio is maintained between the on-axis response and the off-axis response to ensure that the SNR of the radios 105 and 110 are transmitting and/or receiving a high quality signal.

Additionally, the present technology utilizes selective adjustment of the on-axis responses of the radios 105 and 110 to ensure that the on-axis responses are substantially equal to one another.

These features, when combined and optimized allow for the radios 105 and 110 to transmit in synchronization with one another, both in time and on the same channel.

With respect to optimizing an on-axis versus an off-axis response for the radios 105 and 110, the radio 105 can be placed in alignment with a reference line that extends along axis X1. The radio 110 can be placed in alignment with a reference line that extends along axis X2. To be sure, the reference line R1 and R2 are angularly spaced apart from one another by approximately 90 degrees. The angular spacing of the radios 105 and 110 function to reduce the likelihood that radiation bleed over will occur between the radios 105 and 110.

In one embodiment, each of the radios 105 and 110 comprises an enclosure that possesses side lobe rejection shrouds or foam insulation that reduces the broadcast of off-axis radiation. An example radio with enclosure is illustrated and described relative to FIGS. 3A-C.

In addition to the radios being configured to transmit data on the same channel (e.g., frequency) as one another, the radios 105 and 110 may transmit different data from one another, which increases the volume and diversity of data that can be transmitted at the same time.

It will be understood that collocated radios may be grouped together according to a common time reference, such as a time slot. That is, collocated radios may be configured to transmit simultaneously according to a schedule.

The spacing of the radios 105 and 110, as well as careful timing of the data transmissions allow for simultaneous transmission of different data using the same channel. It will be understood that using radios 105 and 110 having adequate side lobe radiation rejection may enhance the efficacy of data transmissions of the radio system 100.

According to some embodiments, the radio system 100 may implement signal synchronization using, for example, GPS time references. The radio system 100 may obtain GPS time references from a GPS satellite system (not shown). A GPS receiver may be associated with each transmitter and receiver individually and may be utilized to obtain GPS time references from the GPS satellite system. In contrast to systems that utilize a common GPS receiver to provide GPS information to a plurality of devices, integrating the GPS receiver within a device itself advantageously eliminates time deltas present in systems that require the transmission of GPS information from a GPS receiver to a desired device. That is, wired or wireless transmission of GPS information between a main GPS receiver and a plurality of devices introduces timing delays.

Thus, in some embodiments each radio 105 and 110 is provided with a GPS module that receives GPS information such as time and location data. The GPS information can be utilized to synchronize the radios 105 and 110 in their broadcast times.

The radios 105 and 110 can be selectively controlled to broadcast on a selected channel by, for example, a human installer or technician. In another example, the radios 105 and 110 are selectively controlled by the cloud controller 155 over a network.

In another embodiment, radio 105 is provided with a GPS module. Radio 105 shares its GPS information with radio 110 over a wired connection such as an Ethernet connection.

In yet another embodiment, the radios 105 and 110 are channel and time synchronized with one another over a network connection. For example, the radios 105 and 110 can receive channel and/or time parameters over a network connection from local WiFi network.

With respect to balancing the on-axis response for the radios 105 and 110, it will be understood that disparities between on-axis responses can occur in certain scenarios. For example, when radio 105 and first far radio 115 are closer one another than radio 110 and second far radio 125, and the radios are all broadcasting at approximately the same power level, the difference in proximity can cause the radio 105 to have an on-axis response that is greater than the on-axis response of the radio 110. This is due to signal power reduction due to free space loss that is greater for radio 110 than radio 105.

To deal with interference this scenario, several methods for receive signal strength balancing (i.e., equalizing) or power back-off may be implemented. One method may be to observe the distance between the radios (collocated and far) and calculating the free space path loss, thereby allowing the transmitters to approximate the power required to achieve a receive signal level. However, this is merely an approximation as path loss is mostly related to distance, but pointing errors and obstructions may add to the loss. For example, if one distance is one kilometer long and another distance is two kilometers long, based on the free space path loss, a transmission for the two kilometer distance may be 6 dBm quieter than a transmission for the one kilometer distance. To achieve the same power level in transmissions, the transmitter or radio for the one kilometer distance may be backed down by 6 dBm.

Another method of implementing power back-off may be a closed-loop method. This method may have the receiver radio communicate the current signal strength to the transmitter radio. Depending on whether the signal strength is higher or lower than the target, the transmitter radio then knows how many decibels to reduce or increase its power level to achieve the target receive signal strength.

In sum, the radios 105 and 110 can have their transmit and/or receive antenna gains selectively adjusted to compensate for disparate signal strengths in their on-axis responses. Selective adjustment of transmit or receive antenna gain can be accomplished using a microprocessor that executes gain adjustment logic stored in memory, in accordance with the examples provided above.

Advantageously, the present technology can be utilized to synchronize collocated radios owned by different entities, such as ISPs. To be sure, multiple radios operated by a plurality of entities can be collocated on public or private structures such as buildings or towers. Since these entities typically do not strategically plan their broadcast schedules, interference frequently occurs between these radios.

In some embodiments, the cloud controller 155 is configured to monitor interference between collocated radios by determining radios that are not operating in synchronization with one another. This lack of synchronization can itself be indicative of interference. In one example, a spectral scanner may be utilized at the collocated radio location to sense asynchronous broadcast periods. In other embodiments, the entities can provide the cloud controller 155 with access to broadcast schedules for their radios.

The cloud controller 155 can identify these out of synch radios and inform the owners of these radios that synchronization may improve network performance. The cloud controller 155 can then synchronize the collocated radios in their channel usage and their operational timing using the aforementioned features.

As mentioned above, the radio system 100 comprises additional collocated radios 135 and 140. The radio system 100 allows for a synchronized timing scheme may result in each transceiver may be assigned a timing. For example, radios 105 and 110 may be assigned a timing A and radios 135 and 140 may be assigned a timing B. The units with timing A transmit at the same time, while timing B units receive during this time. When timing B units are transmitting, timing A units are receiving.

Under the 802.11 standard, there are access points that typically broadcast an SSID, and there are clients/stations that associate with the access points. Using the synchronized timing scheme described above, access points may be allowed to be either timing A, or timing B units, and similarly allow clients/stations to be either. This is necessary, because all radios per tower or site must have the same timing gender to avoid interference, and yet not all radios per location are necessarily access points or clients/stations exclusively.

After placement or installation of the various radios of the radio system 100, each radio may be configured to execute a configuration cycle in order to communicatively couple itself with the radio system 100. The configuration cycle may include execution of a site survey, where the device determines whether a radio is a transmitter or receiver. Because the radios used herein may operate as a transmitter or a receiver, the radio may initially determine whether it has been purposed as a transmitter or a receiver. The radio may be pre-loaded (executable instructions stored in memory) with an augmented service identifier (SSID) information set. Rather than just including a typical identifier that is used to uniquely identify a device on a network, the augmented SSID information set of the present technology may additionally include location information (e.g., latitude and longitude) as well as a mode of operation and security type (e.g., security protocol used by the radio). The location information may allow the radio to deduce or determine additional radios with which the radio has been collocated. If the radio is replacing another radio, a mode of operation instruction set may be provided to the replacement radio that informs the radio of its required mode of operation.

The mode of operation may inform the radio of its broadcast and/or receiving schedules, as well as channel information, such as the shared channel utilized by the plurality of radios.

According to some embodiments, the radio may, upon power up, enter into scan mode to determine a list of collocated radios, as well as broadcast its own SSID to other collocated radios. The radio may then exit the scan mode and perform a manual rescan, listing for configuration information. The radio may reset configuration details to default or factory settings. In other instances, the configuration details determined by the radio during the scan session may be installed or accepted by the radio.

In some instances, if a radio needs to determine its location information, the radio may be configured to broadcast ping signals that are received by, for example, receivers/radios that are not collocated with the radio. Using the time differential between transmission of a ping signal by a radio, relative to receiving of the ping signal by a receiver, an approximate distance between radios may be determined. Again, a GPS counter may track the broadcast and receipt of signals. The radio system may compare the GPS time references associated with the broadcast and received signals to determine distance values.

In other embodiments, each radio (transmitter or receiver) may utilize a media access control (MAC) layer protocol that uses GPS coordinates. When a site survey is conducted, the latitude and longitude of each transmitter and receiver is shown on a map, which may be displayed via a graphical user interface. In other instances, the site survey data points may be stored in a log file.

Additional features can also be implemented, above and beyond radio synchronization. For example, the radio system 100 of FIG. 1 can be configured to selectively vary transmit and receive bandwidth.

In one embodiment, the radio system 100 of FIG. 1, in operation may provide in the 80 megahertz spectrum, 802.11ac wireless data transmission having TCP/IP bandwidth of approximately 4.8 gigabits per second (Gbps), which includes 2.4 Gbps of upload bandwidth and 2.4 Gbps of download bandwidth, assuming the transmit/receive workload of the radio system 100 is split evenly at 50 percent transmit and 50 percent receive. For each antenna the TCP/IP bandwidth may be approximately 1 Gbps to 1.2 Gbps, which includes 500 megabits per second (Mbps) to 600 Mbps of upload bandwidth and 500 Mbps to 600 Mbps of download bandwidth, assuming the transmit/receive workload of the antenna split evenly between 50 percent transmit and 50 percent receive. Advantageously, the available bandwidth of the radio system 100 may be selectively adjusted such that more bandwidth may be dedicated to download bandwidth. For example, the bandwidth split may be selectively adjusted such that the download bandwidth is 70 percent of the total bandwidth of the radio system 100 while the upload bandwidth is approximately 30 percent. Such selective adjustment allows for fine tuning of the radio system 100 to service the needs of end users. For example, when end users frequently consume more download bandwidth than upload bandwidth, the download bandwidth may be increased. This bandwidth split may be automatically varied according to the empirical end user behavior. While the embodiment described provides for wireless data transmission in the 80 MHz spectrum, other embodiments may utilize up to the 160 MHz spectrum, inclusive of the 20 MHz, 40 MHz, or 80 MHz spectrums beneath it.

Figure 2:
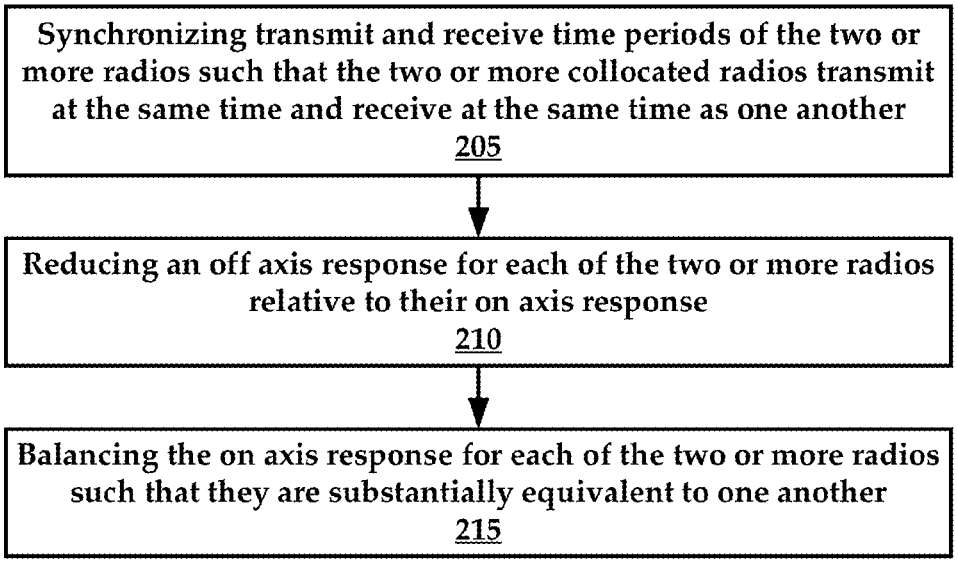
FIG. 2 is a flowchart of an example method for synchronous radio transmission on a shared channel.

FIG. 2 is a flowchart of an example method that is executed in accordance with the present technology. In some embodiments, the method includes transmitting signals on a same channel by two or more collocated radios by initially synchronizing 205 transmit and receive time periods of the two or more radios such that the two or more collocated radios transmit at the same time and receive at the same time as one another.

Again, the radios are collocated in proximity to one another such that without use of the present technology, the radios would interfere with one another when broadcasting and/or receiving.

The method also includes reducing 210 an off-axis response for each of the two or more radios relative to their on-axis response. For example, the reduction in off-axis response can occur with the use of side lobe rejecting enclosures or with adequate angular separation between radios.

Additionally, the method includes balancing 215 the on-axis response for each of the two or more radios such that they are substantially equivalent to one another.

To be sure, the steps of the method need be executed in any particular order. Thus, the reduction in off-axis response may occur due to physical properties or placement of radios, which can occur prior to channel and time synchronization, as well as on-axis response balancing.

Figure 3A:
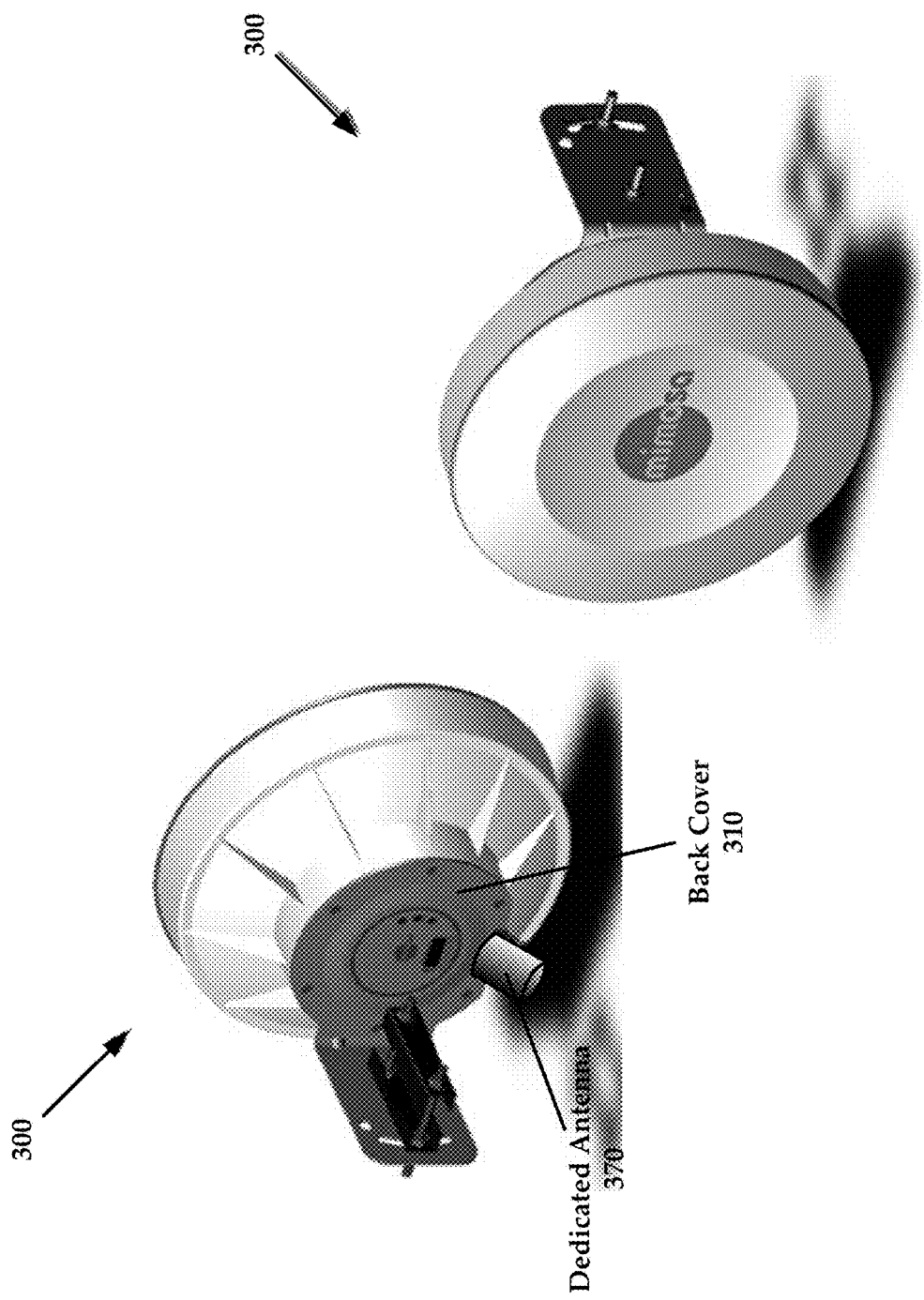
FIGS. 3A-C collectively illustrate an example radio for use in accordance with the present technology.
Figure 3B:
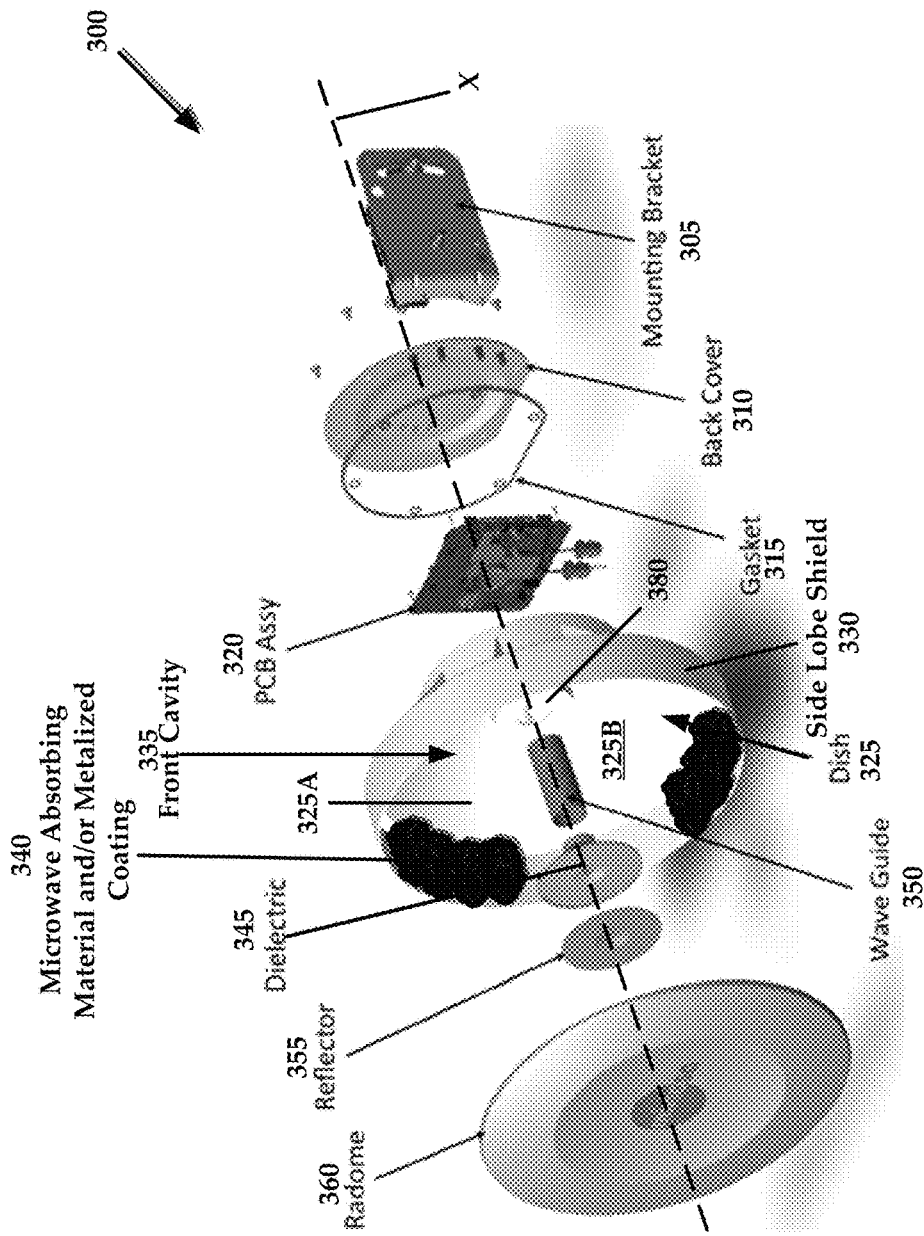
Figure 3C:
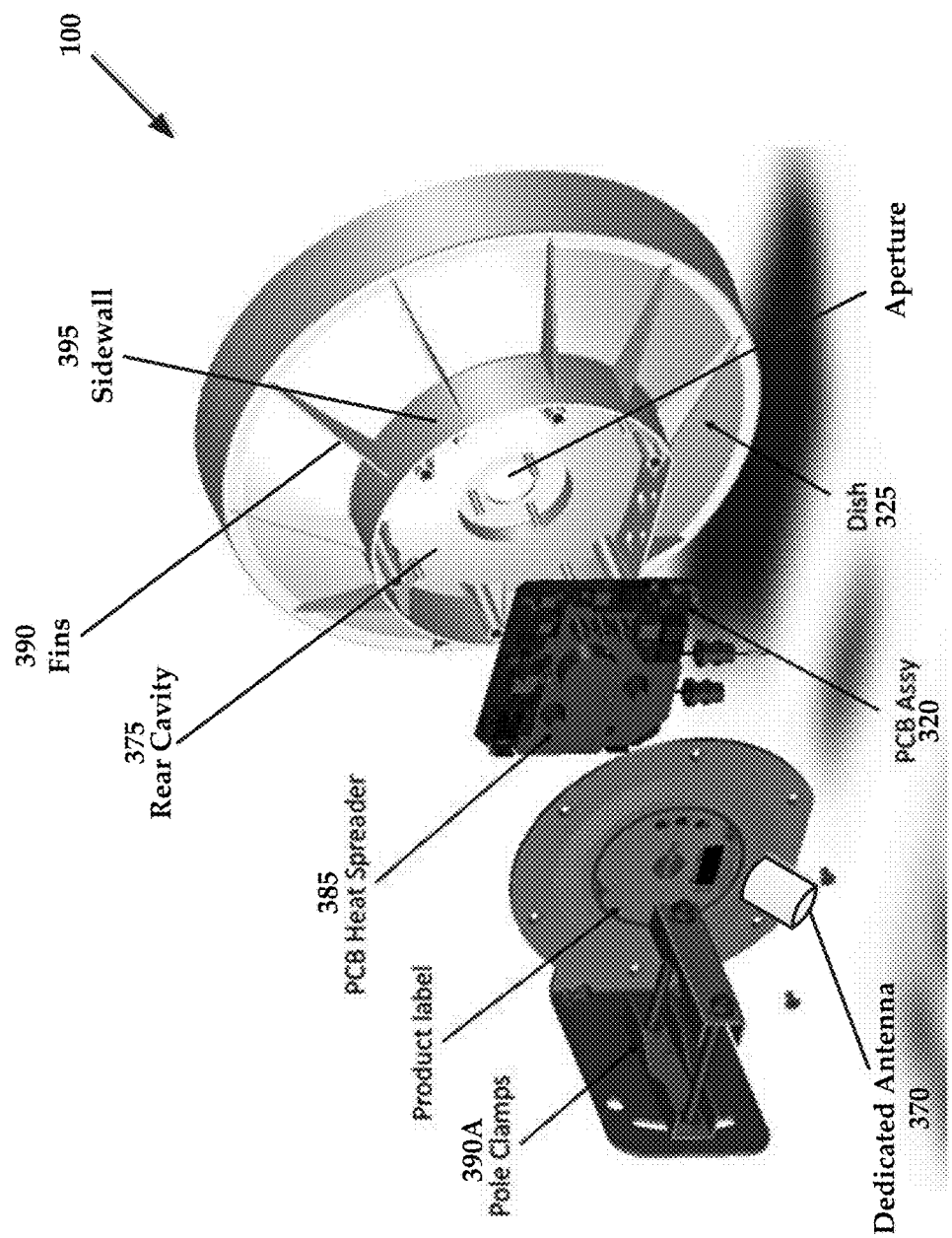

FIGS. 3A-C collectively illustrate an exemplary device 300. FIG. 3A includes front and rear perspective views of a device 300 in an assembled configuration. The device 300 is provided with a dedicated antenna 370 that extends from a back cover 310 of the device 300.

FIG. 3B is an exploded perspective view of the device 300 (e.g., radio). Generally, the device 300 comprises a mounting bracket 305, a back cover 310, a gasket 315, a PCB (printed circuit board) assembly 320, a dish 325, a cylindrical dielectric plate 345, a reflector 355, and a radome 360.

It will be understood that advantageously, the dish of the present technology is manufactured monolithically as one piece. That is, the dish antenna (also referenced as "dish") 325 includes a parabolic circular reflector 325A that is bounded by the side lobe shield 330 to form the front cavity 335, and rear cavity 375. All these components are manufactured as a single device, as opposed to technologies where dishes are formed from separate components that are assembled in the field. Further, many dishes are an amalgamation of parts from a plurality of manufacturers, which can lead to physical incompatibility and on the fly modification in the field.

Advantageously, the monolithic dish provides advantages such as reduced manufacturing cost, since the dish can be manufactured in a single process. For example, the dish can be manufactured using injection molding, or any other similar process that is capable of producing a dish with the physical features as those illustrated in the drawings of the disclosure.

Another advantage of the monolithic structure is that it allows for storage and incorporation of necessary electronics for the antenna within the dish. For example, the PCB assembly 320 can be housed within the rear cavity 375. This places the PCB assembly 320 and waveguide 350 (discussed in greater detail below) in very close proximity to the parabolic circular reflector 325A, which reduces or eliminates signal attenuation of signals produced by the PCB assembly 320 that are directed through the waveguide 350 that would be present if the PCB assembly 320 and/or waveguide 350 are not located proximate the parabolic circular reflector 325A.

The mounting bracket 305 that allows the device 300 to be pivotally coupled to a mounting surface, such as a tower (not shown). The ability of the device 300 to be pivotally connected to a mounting surface allows for an azimuth angle to be established, as would be known to one of ordinary skill in the art with the present disclosure before them. While the mounting bracket 305 has been described, the device 300 couples with a structure using any one or more of a number of mechanisms that would be apparent to one of ordinary skill in the art with the present disclosure before them. The mounting bracket 305 couples with a back cover via a plurality of fasteners. The mounting bracket 305 couples to the back cover 310 using fasteners.

In some embodiments, the mounting bracket 305 couples with a set of pole clamps 390A that allow the device 300 to be clamped to a pole or other similar structure.

The device 300 also comprises a dish antenna 325 that is formed so as to include a rear cavity 375 (see FIG. 3C) and a front cavity 335. A PCB assembly 320 is disposed at least partially within the rear cavity of the dish. The PCB assembly 320 includes any circuits needed to operate the device 300. In some embodiments, the dish antenna 325 is a parabolic circular reflector 325A that is bounded by the side lobe shield 330 to form the front cavity 335. The front cavity extends forwardly from the dish.

The shape of the parabolic reflector depends upon the desired radiation pattern for the device 300. Thus, the exact shape and size of the parabolic circular reflector varies according to design and implementational requirements.

A seal, such as a gasket 315, is disposed between the outer peripheral edge of the rear cavity 375 and the back cover 310 to sealingly protect the PCB assembly 320 from contamination. The PCB assembly 320 also includes a PCB heat spreader 385 or other means for transferring heat generated by the PCB assembly 320 to the ambient environment such as fans and so forth.

In some instances, the dish 325 includes a side lobe shield 330 that extends beyond the outer peripheral edge of the dish 325. In some instances the side lobe shield 330 is a shroud having a sidewall that forms a ring around the outer peripheral edge of an upper surface of the dish 325. The side lobe shield 330 extends from the dish 325 axially along a longitudinal axis X of the device 300.

The dish 325, in some embodiments, is manufactured as a monolithic or one piece device. The dish 325 is manufactured from any one or combination of materials that are suitable for use as with an antenna.

Advantageously, the inner surface of the side lobe shield 330 is provided with a metalized coating. The upper surface 325B of the parabolic circular reflector 325A also includes a metalized coating. In some instances at least a portion of the inner surface of the side lobe shield is augmented with a metallic coating and/or a microwave absorbing material (also known as the "material") 340, such as a foam or other electrically insulating material that is coated along the inner surface of the front cavity 335 of the dish 325. For example, the material 340 lines the inner portion of the side lobe shield 330.

The upper surface 325B is generally circular and parabolic in shape, which aids in directing radiation along the longitudinal axis X. Again, the shape of the dish 325 functions to reduce emissions of side lobe radiation. In some embodiments, the dish 325 has an annular shaped mounting ring 380 that is configured to receive the wave guide 350.

The microwave absorbing material 340 is shown as being disposed within the front cavity 335 in FIG. 3B, but can also be applied or sprayed to the inner surface of the side lobe shield 330. In other instances, the microwave absorbing material 340 is integrated into the side lobe shield 330 itself. That is, the side lobe shield 330 is manufactured as a layered or composite. For example, the side lobe shield 330 comprises a substrate of a metallic material that has a layer of microwave absorbing material applied thereto. Specifically, the absorbing material would be applied to a surface of the side lobe shield that is proximate the wave guide 350 of the device.

In other embodiments, a metalized coating is applied to the entire upper surface of the dish 325 and the inner sidewall of the side lobe shield 330.

Because the side lobe shield 330 extends beyond the outer peripheral edge of the dish 325, the side lobe shield 330 functions to direct the signals reflected by the dish surface in a more uniform and directed pattern. For example, the side lobe shield 330 reduces side lobe radiation which is transmitted from and/or received by the device 300. Thus, the device 300 reduces an amount of signals (e.g., radiation) which are received by the device 300 such as those transmitted by adjacent transmitters. Also, the side lobe shield 330 of the device 300 also reduces an amount of microwave signals transmitted via side lobe projection by the device 300. Thus, the device 300 reduces both the transmission and reception of deleterious side lobe signals.

The device 300 also comprises a wave guide 350 that is communicatively coupled with the PCB assembly 320. A cylindrical dielectric plate 345 couples with the wave guide 350. Also, a reflector 355 is associated with the cylindrical dielectric plate 345. The combination of the PCB assembly 320, wave guide 350, cylindrical dielectric plate 345, and reflector 355 are collectively referred to as a "radio." A radome cover 360 attaches to the side lobe shield 330 to sealingly cover the reflector 355, cylindrical dielectric plate 345, and wave guide 350 that are housed within the front cavity 335.

It will be understood that the radome 360, side lobe shield 330, dish 325, and back cover 310 of the device 300 is constructed from any suitable material such as a plastic, a polymeric material, a resin, a composite material, a natural material, or any other material that would be known to one of ordinary skill in the art.

According to some embodiments, the dish 325 and the side lobe shield 330 is manufactured as an integral unit. Moreover, the rear cavity 375 of the dish 325 is formed to provide a mounting surface for receiving the PCB assembly 320. The rear cavity 375 is formed by a sidewall 395 that extends rearwardly from the dish antenna 325 along the longitudinal axis X. The sidewall 395 extends in an opposing direction from the side lobe shield 330.

The dish 325, as an integral unit, is manufactured from a plastic material, a polymeric material, a resin, a composite material, or other suitable material that would be known to one of ordinary skill in the art with the present disclosure before them. As mentioned before, the inner sidewall of the side lobe shield 330 and the upper surface 325A of the dish 325 is metalized while the rear cavity 375 is not metalized. Additionally, the side lobe shield 330 is provided with a microwave insulating material.

According to some embodiments, the dish antenna 325 comprises a series of fins 390. These fins 390 may extend from the rear cavity 375 upwardly to the edge of the side lobe shield 330. More specifically, the series of fins extends upwardly from the sidewall of the rear cavity along an underside of the parabolic circular reflector or dish 325.

Figure 4:
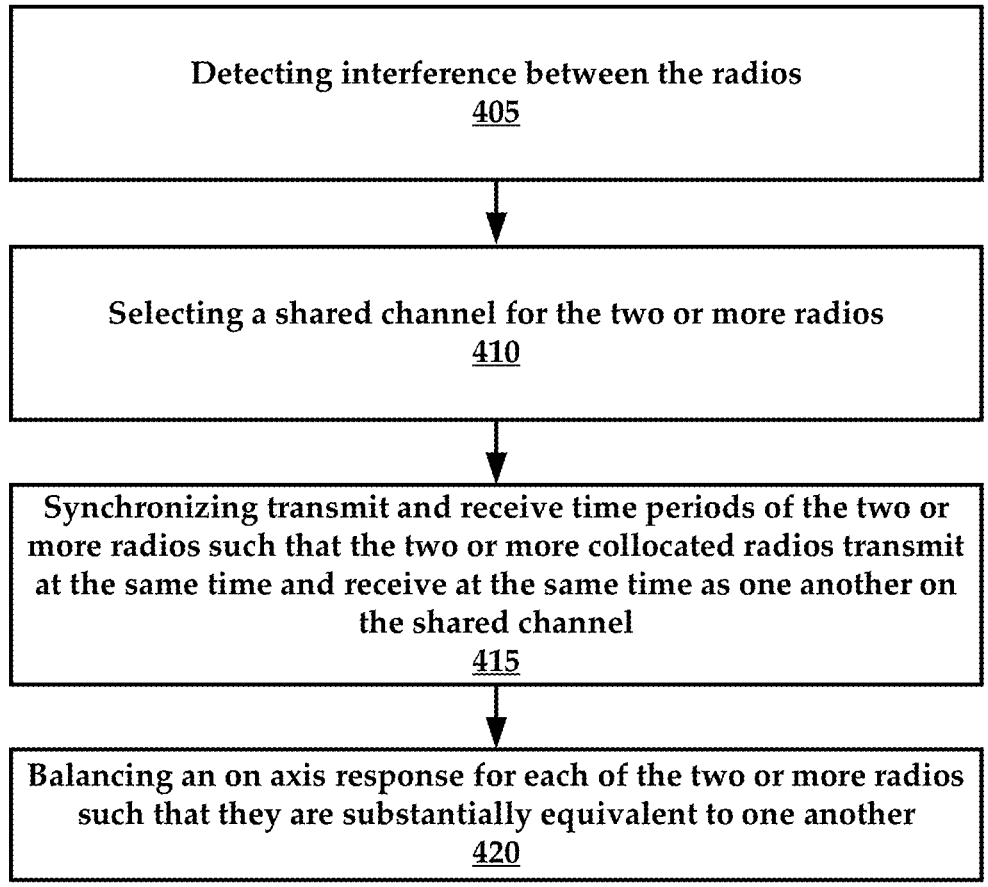
FIG. 4 is another example method for synchronous radio transmission on a shared channel.

FIG. 4 is a flowchart of another example method of the present technology. To be sure, the method involves communication synchronization between two or more radios. As mentioned herein, the two or more radios have angular separation or physical characteristics that optimize their on-axis responses.

The method can include an optional step of detecting 405 interference between the radios. This could include a cloud controller that is configured to detect when collocated radios are interfering with one another by detecting non-synchronized broadcast time periods of multiple radios. The method can also omit step 405 in some embodiments.

In one embodiment, the method includes selecting 410 a shared channel for the two or more radios. For example, the cloud controller can select 80 MHz as the shared frequency/channel.

Next, the method includes synchronizing 415 transmit and receive time periods of the two or more radios such that the two or more collocated radios transmit at the same time and receive at the same time as one another on the shared channel. As mentioned above, this could be accomplished using GPS modules in each of the radios.

In some embodiments, the method includes balancing 420 an on-axis response for each of the two or more radios such that they are substantially equivalent to one another.

Indeed, the combination of on-axis response balancing with off-axis response reduction to produce adequate signal to noise ratio at each of the radios, as well as time and channel uniformity allow for synchronized transmission of data by two or more collocated radios.

Figure 5:
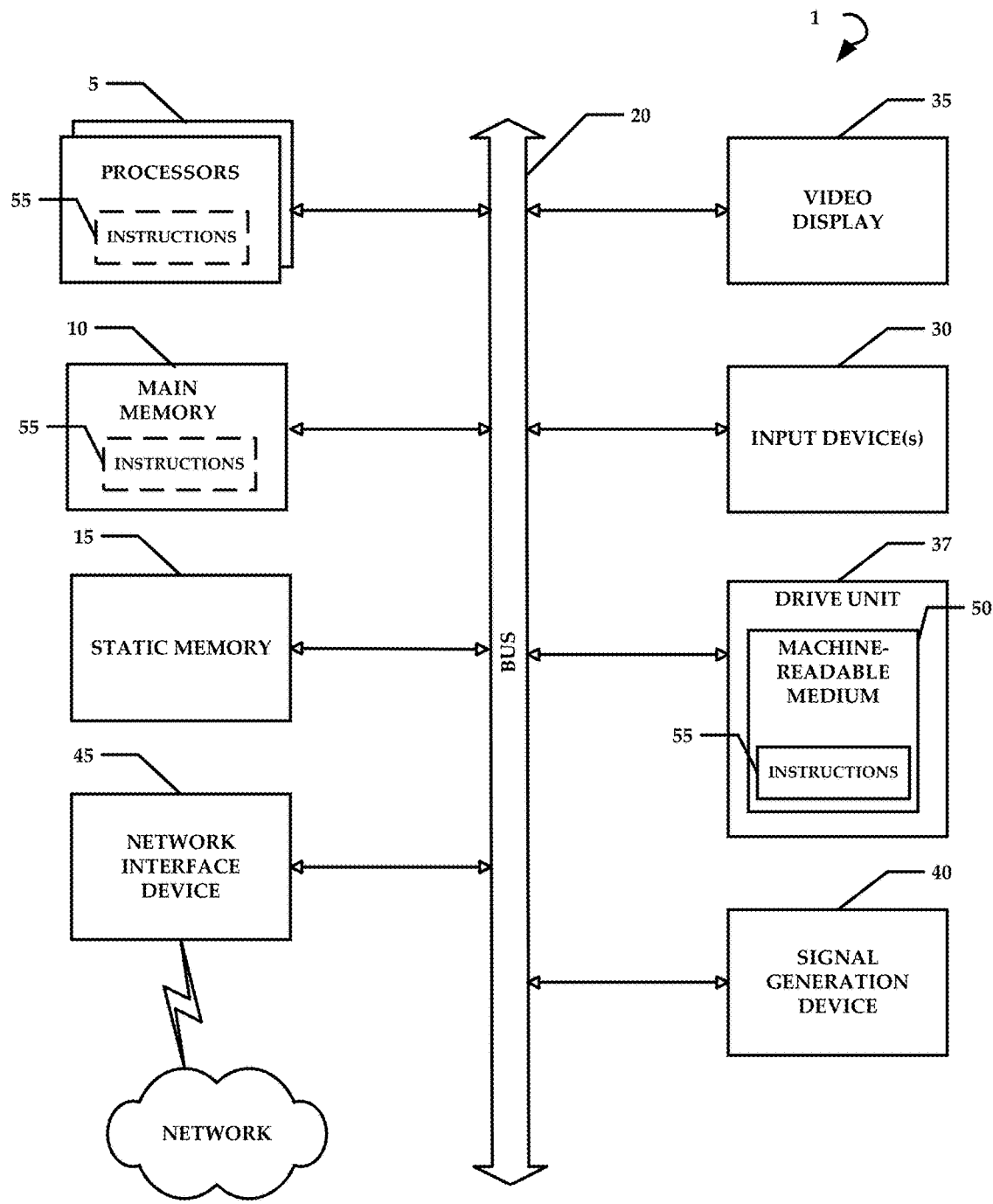
FIG. 5 illustrates an exemplary computing device that may be used to implement embodiments according to the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a radio, a base station, a personal computer (PC), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as I/O devices.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising two or more radios collocated with one another, the two or more radios communicating with two far radios over a pair of long range wireless links, the two or more radios being configured to transmit and receive in synchronization with one another on a same channel, wherein an off-axis response for each of the two or more radios is reduced compared to their on-axis response for improved signal to noise ratio, further wherein the on-axis response the two or more radios are substantially equal to one another, wherein the on-axis response for a radio occurs along a main axis between the two or more radios and the two far radios, and the off-axis response occurs when interference is experienced based on overlapping signals generated between any of the two or more radios and the two far radios, further wherein any of transmit and receive antenna gains of the two or more radios are selectively adjusted to compensate for disparate signal strengths in their on-axis responses.

2. The system according to claim 1, wherein the two or more radios are time division duplex radios.

3. The system according to claim 1, wherein the off-axis response compared with the on-axis response is within a signal to noise ratio of approximately 6 dBm.

4. The system according to claim 1, wherein the two or more radios are synchronized by GPS modules in each of the two or more radios.

5. The system according to claim 1, wherein one of the two or more radios comprises a GPS module and the one radio is coupled to the other of the two or more radios with a wired link to share GPS information allowing the two or more radios to synchronize.

6. The system according to claim 1, wherein each of the two or more radios comprises a shroud that provides side lobe rejection to prevent signal overlap there between.

7. The system according to claim 1, wherein each of the two or more radios are synchronized over a network.

8. The system according to claim 1, wherein the on-axis response of each of the two or more radios is selectively adjusted by adjusting an antenna gain of the each of the two or more radios.

9. The system according to claim 1, wherein an antenna gain of each of the two far radios is selectively adjustable to allow the on-axis response of each of the two or more radios to be substantially equal to one another.

10. The system according to claim 1, wherein the on-axis responses of the two or more radios are spaced apart from one another to reduce the off-axis response of each of the two or more radios.

11. The system according to claim 1, further comprising a cloud controller in communication with each of the two or more radios, the cloud controller being configured to balance the on-axis response of the two or more radios relative to one another.

12. The system according to claim 11, wherein the cloud controller is further configured to detect additional radios in proximity to the two or more radios, the additional radios producing interference relative to the two or more radios.

13. A method, comprising:
transmitting signals on a same channel by two or more collocated radios by:
synchronizing transmit and receive time periods of the two or more collocated radios such that the two or more collocated radios transmit at a same time and receive at a same time as one another;
reducing an off-axis response for each of the two or more collocated radios relative to their on-axis response, wherein the on-axis response for a radio occurs along a main axis between the two or more collocated radios and two far radios, and the off-axis response occurs when interference is experienced based on overlapping signals generated between any of the two or more collocated radios and the two far radios; and balancing the on-axis response for each of the two or more collocated radios such that they are substantially equivalent to one another.

14. The method according to claim 13, wherein reducing an off-axis response for each of the two or more collocated radios relative to their on-axis response comprises optimizing angular separation between the two or more collocated radios.

15. The method according to claim 13, further comprising detecting interference between the two or more collocated radios prior to synchronizing the two or more collocated radios.

16. The method according to claim 13, wherein the two or more collocated radios are each owned by different entities.

17. A method of communication synchronization between two or more radios, the two or more radios having angular separation or physical characteristics that optimize their on-axis responses, the method comprising:

selecting a shared channel for the two or more radios;

synchronizing transmit and receive time periods of the two or more radios such that the two or more radios transmit at a same time and receive at a same time as one another on the shared channel; and balancing the on-axis response for each of the two or more radios such that they are substantially equivalent to one another, wherein the on-axis response for a radio occurs along a main axis between the two or more radios and two far radios, and an off-axis response occurs when interference is experienced based on overlapping signals generated between any of the two or more radios and the two far radios.

18. The method according to claim 17, wherein the physical characteristics comprise radio shrouds with side lobe rejection.

19. The method according to claim 17, wherein the synchronizing transmit and receive time periods comprises:

receiving at one of the two or more radios, GPS information; and providing the GPS information to the other of the two or more radios over a wired link or a network connection, wherein the GPS information is used to synchronize the two or more radios.

20. The method according to claim 13, further comprising receiving GPS information in order to synchronize the transmit and receive time periods.

* * * * *